B. H. DAVIS.
Stump and Rock Elevators.
No. 157,739.
Patented Dec. 15, 1874.
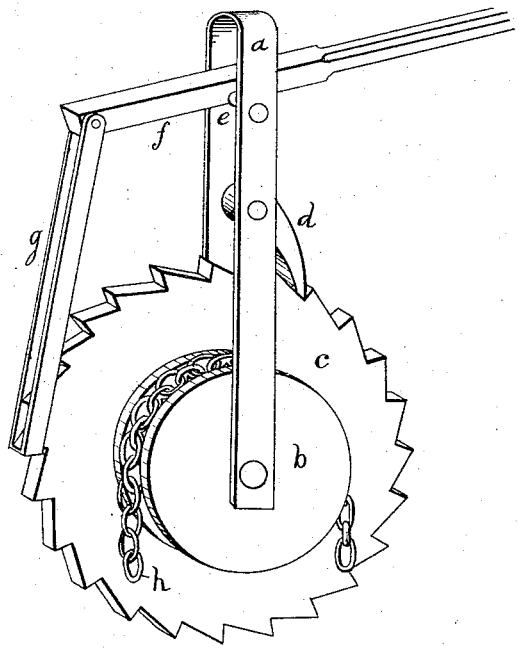
WITNESSES:
INVENTOR.

UNITED STATES PATENT OFFICE.

BENJAMIN H. DAVIS, OF FOXCROFT, MAINE.

IMPROVEMENT IN STUMP AND ROCK ELEVATORS.

Specification forming part of Letters Patent No. 157,739, dated December 15, 1874; application filed November 16, 1874.

*To all whom it may concern:*

Be it known that I, BENJAMIN HARVEY DAVIS, of Foxcroft, in the county of Piscataquis and State of Maine, have invented certain new and useful Improvements in Stump and Rock Elevators; and I do hereby declare that the following is a full, clear, and exact description thereof, that will enable others skilled in the art to which it appertains to make and use the same, reference being had to the accompanying drawings, forming a part of this specification, in which is shown a perspective view of my device.

My invention consists of the combination of a lever, ratchet, and sprocket wheels and pawl, arranged in a suspended yoke.

Referring to the drawing, $a$ shows the yoke, sustaining the operating mechanism. This yoke is suspended from any suitable framework — as, for instance, the tripod frame in common use. Its lower and open ends support a shaft, upon which are a ratchet-wheel, $c$, and a sprocket-wheel, $b$, rigidly attached to each other and revolving together. The sprocket-wheel is provided with openings and spurs for the reception of the links of a chain, $h$, to which the object to be raised is attached in any ordinary manner. Just above the ratchet-wheel is a pawl, $d$, attached to the yoke $a$, and engaging with the teeth of the ratchet. At $e$ is a rod, extending from side to side of the yoke $a$, which rod serves as a fulcrum for a lever, $f$, provided with a link, $g$, at the end of its short arm, which link drops onto the ratchet-wheel $c$, and engages with its teeth, giving rotation to said wheel, and to the attached sprocket-wheel, as the lever is operated. The stump or rock to be raised is attached to the chain $h$, passing over the sprocket-wheel $b$, and as said wheel is revolved by the action of the lever and link upon the teeth of the ratchet its projections or spurs engage with the links of the chain raising the attached weight, while the pawl $d$ holds it as it rises. The ratchet and sprocket wheels, being united, really form in effect but one wheel, $c$ $b$.

What I claim as my invention is—

The combination of the lever $f$ and link $g$, with the ratchet and sprocket wheel $c$ $b$, pawl $d$, and chain $h$, all arranged in a suspended yoke, $a$, substantially as set forth and shown.

In testimony that I claim the foregoing I have hereunto set my hand this 12th day of November, 1874.

BENJ. H. DAVIS.

Witnesses:
   W. E. BROWN,
   WM. FRANKLIN SEAVEY.